UNITED STATES PATENT OFFICE.

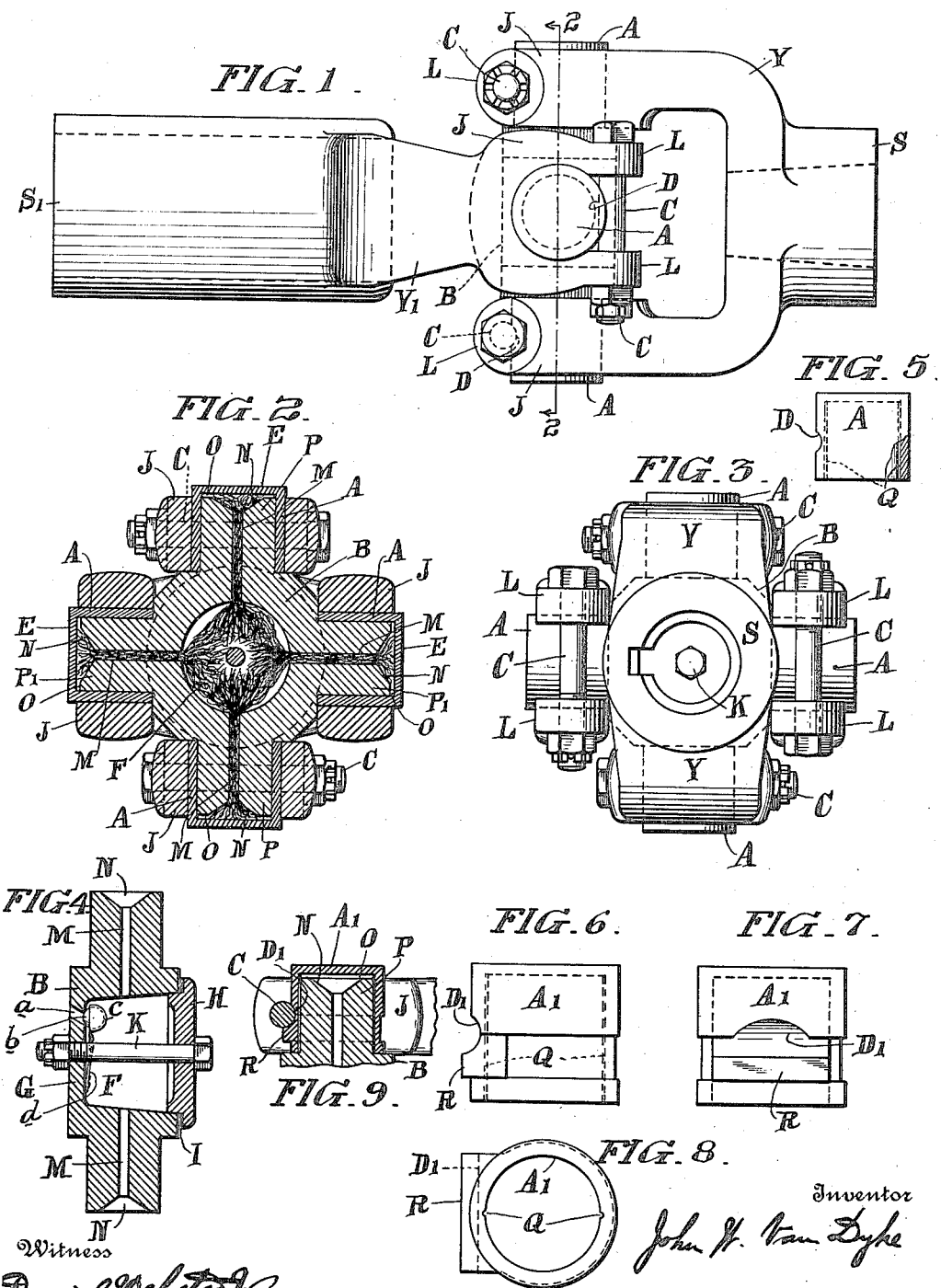
J. W. VAN DYKE.
UNIVERSAL JOINT.
APPLICATION FILED NOV. 29, 1915.
1,186,625. Patented June 13, 1916.

JOHN W. VAN DYKE, OF PHILADELPHIA, PENNSYLVANIA.

UNIVERSAL JOINT.

1,186,625. Specification of Letters Patent. Patented June 13, 1916.

Application filed November 29, 1915. Serial No. 63,929.

*To all whom it may concern:*

Be it known that I, JOHN W. VAN DYKE, a citizen of the United States, residing in the city of Philadelphia, county of Philadelphia, and State of Pennsylvania, have invented a new and useful Universal Joint, of which the following is a specification.

My invention relates to an universal joint through which power is transmitted from one rotating shaft to another, particularly when the axes of the shafts are non-coincident or at an angle with respect to each other, as in the power transmission mechanism of an automobile, motor truck or analogous apparatus.

My invention comprises in an universal joint an intermediate member or block having pins or short shafts bearing in bushings carried in yokes or similar members secured respectively to the driving and driven shafts, the intermediate member or block being provided with means of the character hereinafter described for lubricating the pin and bushing bearings; and my invention comprises a structure of the character hereinafter described by which the bearing bushings are suitably held by or secured to the shaft yokes or analogous members and adapting them and the joint as a whole for easy assemblage or replacement of parts.

For an illustration of one of the forms my invention may take, reference may be had to the accompanying drawings, in which:

Figure 1 is a side elevation of an universal joint embodying my invention. Fig. 2 is a cross sectional view taken on the line 2—2 of Fig. 1. Fig. 3 is an end elevational view of the joint shown in Fig. 1. Fig. 4 is a cross sectional view through the intermediate member or block. Fig. 5 is a plan view, partly in section, of a bushing. Fig. 6 is a plan view of a modified form of bushing. Fig. 7 is a side elevational view of the bushing shown in Fig. 6 taken at right angles thereto. Fig. 8 is an end elevational view of the bushing shown in Fig. 6. Fig. 9 is a fragmentary sectional view showing the relation of the bushing of the character shown in Fig. 6 with respect to a bearing pin, bolt and arm of a yoke.

Referring to Figs. 1 to 4 inclusive, Y and $Y^1$ are yokes secured at their hubs or sleeves S and $S^1$ to the driving and driven shafts which are required to coöperate when their axes are not co-incident or are at an angle with respect to each other, the axes of the sleeves S and $S^1$ being shown co-incident in Fig. 1 by way of example.

The intermediate member of block B has the preferably integral cylindrical pins or short shafts P, P whose axes are co-incident, and the similar pins $P^1$, $P^1$ with their axes co-incident but at right angles to the axes of the pins P, P. Receiving these bearing pins are the bushings A, of bronze or other suitable material, which receive the bearing pins and which are clamped in the bifurcated ends or jaws J of the yokes, these jaws having a cylindrical bore to receive the bushings A, the bores being, however, circumferentially incomplete, but greater than a half circumference, leaving a gap between the lugs L, L of each jaw J. Extending through each pair of lugs L is a bolt C. The bushing A is recessed or grooved in its outer cylindrical surface as at D, Fig. 5, to form a channel or groove in which the bolt C fits. Drawing up upon or tightening the bolt C draws the lugs L toward each other to clamp the jaw J upon the bushing A, and the bolt C extending through the channel D further serves to prevent rotation of the bushing A and to prevent its displacement longitudinally of its bearing pin P.

The bushings A are shown closed at their ends E to inclose and cover the bearing pins to prevent entry of dirt or grit and to assist in the lubrication of these bearings.

The intermediate member or block B may be made by drop forging or may be otherwise produced. It has the cavity F, Figs. 2 and 4, which is closed at one side by the part G forming a part of the block B itself and closed at its other side by a cap H beneath which may be provided a gasket I. A bolt K holds the cap H snugly in position to form a tight closure for the cavity F in which may be placed oil or other suitable lubricating material. Communicating with the cavity F and extending through the bearing pins P, $P^1$ are the holes M terminating in countersinks or cavities N in the ends of the bearing pins. The inner ends of the bushings A extend to the block B and the internal lengths of the bushings A are somewhat greater than the lengths of the bearing pins to leave clearances O with which communicate one or more grooves Q extending longitudinally in the inner bearing surface of each of the bushings A. Within the holes M may be placed wicking or the like extending into the cavity F and into the countersinks or cavities N to facilitate transfer of lubricant from the cavity F into the countersink N from which it will find its way through the clearance O and into the grooves Q to lubricate the bearings of the pins P, P¹ within the bushings A.

When the universal joint is rotating, the transfer of lubricant outwardly to the cavities N and thence through the clearance O and into the grooves Q will be facilitated by the centrifugal force acting upon the lubricant.

It will be readily understood that the closure G for one side of the cavity F may be omitted and replaced by another cap similar to the cap H and held by the bolt K.

The diameters of the bearing pins P, P¹ is preferably such that it is not greater than the distance between the inner faces of the lugs L whereby upon removing the bolt C and thereafter removing the bushing A, a yoke may be removed to the right or left, Fig. 1, the space between the inner faces of the lugs L allowing the jaw J to pass over the bearing pin.

From the foregoing description it is apparent that the structure of the joint is such that a new bushing may readily be replaced simply by removing a bolt C, withdrawing the old bushing and inserting a new one and replacing the bolt. And that as a whole the universal joint is easily assembled or taken apart.

In Figs. 6 to 8 inclusive is illustrated a modified structure of bushing A¹. The bolt groove or channel D¹ is formed partly in a lug R of a height, Fig. 8, equal to or slightly less than the distance between the inner faces of the lugs L of a yoke jaw J. By the employment of this lug D the circumferential extent of the groove D¹ is greater than in the arrangement of Figs. 1 to 4 inclusive, giving a greater surface of engagement between the bushing D¹ and the bolt C. It will be noted that the lug R and groove D¹ are so disposed that the lug R is on that end of the bushing A¹ nearest the body of the block B. By this construction outward movement of a bushing A¹ longitudinally of its bearing pin is prevented with greater certainty.

In Fig. 9 a bushing A¹ is shown assembled with the bearing pin P, bolt C and the yoke jaw J.

Lubricant may be introduced into the cavity F of the block B through a spout introduced through the hole a, Fig. 4, normally held closed by a ball b in the cup c on the end of a spring d. The introduction of the spout will raise the ball b from its seat and allow admission of oil and upon withdrawing the spout the spring d will return the ball b to its seat and prevent egress of lubricant.

What I claim is:

1. An universal joint comprising a block having a bearing pin thereon, a bushing for said pin, a jaw for receiving said bushing, said bushing being insertible longitudinally of said pin from the outer end thereof into said jaw, and means for clamping said jaw upon said bushing.

2. An universal joint comprising a block having a bearing pin thereon, a bushing for said pin, jaw members yielding with respect to each other, said members having an interspace into which said bushing may be inserted over and longitudinally of said pin from the outer end thereof, and means for clamping said members against said bushing.

3. An universal joint comprising a block having a bearing pin thereon, a bushing for said pin, a slotted jaw, and means for clamping said jaw upon said bushing, the slot of said jaw having a width insufficient for passage of said bushing therethrough.

4. An universal joint comprising a block having a bearing pin thereon, a bushing for said pin, a slotted jaw, and means for clamping said jaw upon said bushing, the slot of said jaw permitting removal of said jaw from said pin transversely thereto.

5. An universal joint comprising a block having a bearing pin thereon, a bushing for said pin, a slotted jaw, means for clamping said jaw upon said bushing, the slot of said jaw having a width insufficient for passage of said bushing therethrough, displacement of said bushing longitudinally of said pin being prevented.

6. An universal joint comprising a block having a bearing pin thereon, a bushing for said pin, a slotted jaw, and means for clamping said jaw upon said bushing, the slot of said jaw having a width insufficient for passage of said bushing therethrough and sufficient to allow withdrawal of said jaw from said pin.

7. An universal joint comprising a block having a bearing pin thereon, a bushing for said pin, a slotted jaw, means for clamping said jaw upon said bushing, the slot of said jaw permitting passage of said jaw from said pin transversely thereto, displacement of said bushing longitudinally of said pin being prevented.

8. An universal joint comprising a block having a bearing pin thereon, a bushing for said pin, a slotted jaw, means for clamping said jaw upon said bushing, the slot of said jaw being insufficient for passage of said bushing therethrough and sufficient to allow withdrawal of said jaw from said pin, displacement of said bushing longitudinally of said pin being prevented.

9. An universal joint comprising a block having a bearing pin thereon, a bushing for said pin, a jaw comprising spaced integral members, a bolt for clamping said jaw members upon said bushing, said bushing interlocking with said bolt to prevent movement of said bushing longitudinally of said pin.

10. An universal joint comprising a block having a bearing pin thereon, a bushing for said pin, a jaw comprising spaced integral members, a bolt for clamping said jaw members upon said bushing, said bushing having a groove receiving said bolt.

11. An universal joint comprising a block having a bearing pin thereon, a bushing for said pin, a jaw member, a bolt for clamping said jaw member upon said bushing, said bushing having a lug engaging said bolt.

12. An universal joint comprising a block having a bearing pin thereon, a bushing for said pin, a slotted jaw member, a bolt for clamping said jaw member upon said bushing, said bushing having a lug engaging said bolt, said lug having a height substantially equal to the width of the slot of said jaw member.

13. An universal joint comprising a block having a bearing pin thereon, a bushing for said pin, a bifurcated member having an opening allowing insertion of said pin therethrough and less than the diameter of said bushing, and a bolt for clamping said bifurcated member upon said bushing, said bushing having a groove receiving said bolt whereby said bushing is held against movement longitudinally of said pin.

14. An universal joint comprising a block having a bearing pin thereon, a bushing for said pin, a bifurcated member having an opening allowing insertion of said pin therethrough and less than the diameter of said bushing, and a bolt for clamping said bifurcated member upon said bushing, said bushing interlocking with said bolt to prevent rotation of said bushing and movement thereof longitudinally of said pin.

15. An universal joint comprising a block having a bearing pin thereon, a bushing for said pin, a bifurcated member having an opening for receiving said bushing only in a direction longitudinally of said pin, said opening between the arms of said bifurcated member having a width sufficient to allow passage of said member from said pin, and means for clamping said bifurcated member upon said bushing.

16. An universal joint comprising a block having a bearing pin thereon, a bushing for said pin, a bifurcated member having an opening for receiving said bushing only in a direction longitudinally of said pin, said opening between the arms of said bifurcated member having a width sufficient to allow passage of said member from said pin, and a bolt extending through said bifurcated member and interlocking with said bushing to prevent longitudinal and rotative movement thereof.

In testimony whereof I have hereunto affixed my signature this 27th day of November, 1915.

JOHN W. VAN DYKE.